Jan. 26, 1926.

C. E. GREEN ET AL 1,571,116

TEA, COFFEE, AND LIKE POT

Filed August 3, 1925

Inventors
Charles Edward Green
Kathleen Sinclair Stevenson
By
James L. Norris
Attorney Patented Jan. 26, 1926.

1,571,116

UNITED STATES PATENT OFFICE.

CHARLES EDWARD GREEN, OF LONDON, AND KATHLEEN SINCLAIR STEVENSON, OF KENSINGTON, LONDON, ENGLAND.

TEA, COFFEE, AND LIKE POT.

Application filed August 3, 1925. Serial No. 47,838.

*To all whom it may concern:*

Be it known that CHARLES EDWARD GREEN and KATHLEEN SINCLAIR STEVENSON, subjects of the King of Great Britain, residing at London, England, and Kensington, London, England, respectively, have invented certain new and useful Improvements in Tea, Coffee, and like Pots, of which the following is a specification.

The invention relates to that class of tea or coffee pot or the like employing a drip catcher comprising a chamber or receptacle forming part of the spout and into which drips will pass when the pot is stood upright after pouring out some of the contents and be retained instead of the drips falling on to the table cloth or tray as is the case with ordinary makes of tea or coffee pots.

Now the object of this invention is to construct such an article in a new or improved manner whereby the spout is not increased in size, as is the case with known constructions, can be readily made without materially increasing the cost of the pot, is more efficient in use even if the lip of the spout gets broken, the chamber can be readily glazed, the shape of the pot is not materially interfered with and further can be easily cleaned.

Our invention will be clearly understood from the following description aided by the annexed drawings in which—

Figure 1:
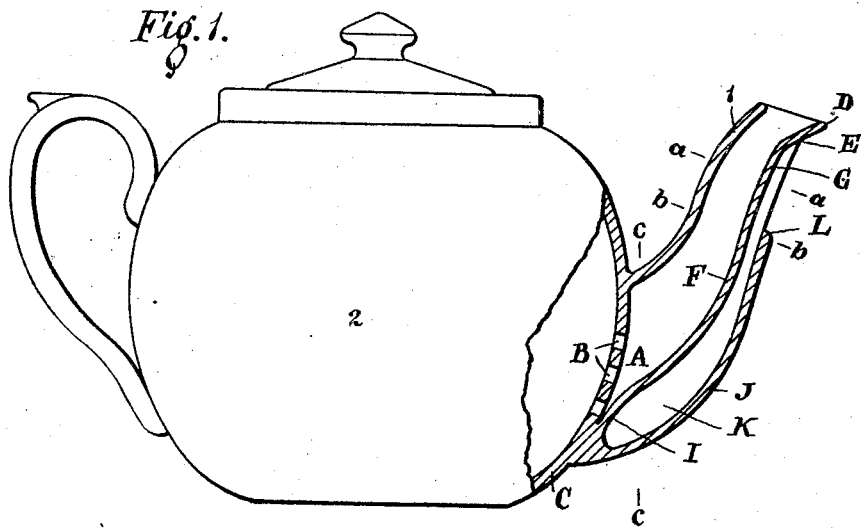
Figure 1 is a side elevation of a tea pot with a portion of the body and the spout in section.
Figure 2:
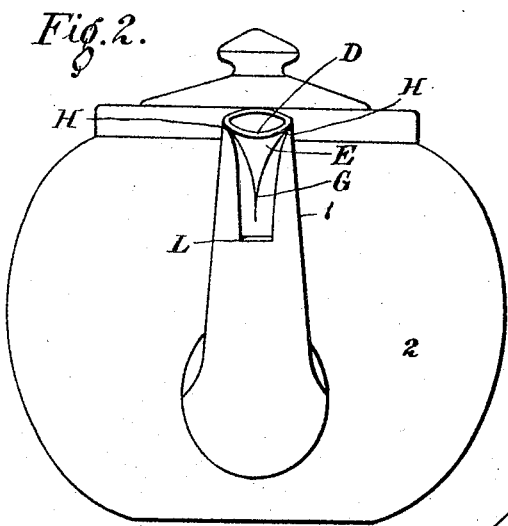
Figure 2 is a view of a tea pot looking at the spout.
Figure 3:
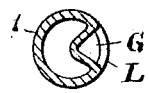
Figure 3 is a section on the line *a a* of Figure 1.
Figure 4:
Figure 4 is a section on the line *b b* of Figure 1.
Figure 5:
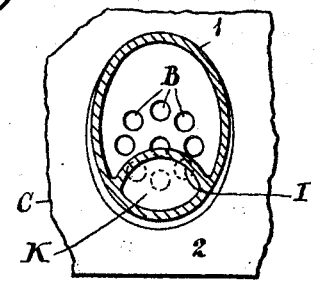
Figure 5 is a section on the line *c c* of Figure 1.

According to this invention we construct the spout 1 proper with its inlet end A of a size to surround the perforations B in the wall C of the pot and with the pouring lip D extending, the under portion E of the spout or lip D being curved or directed downwards for a short distance and then given a different curve F or straight line and curve towards the wall C of the pot.

In the outer or under wall of the spout from just under the lip portion we form a groove or channel G converging at top H and bottom I.

At the under portion of the spout 1 we position a bellied wall J which is attached to the edges of a portion of the grooves G, I and forms a chamber K with the top edge L left open and such opening is positioned at a short distance below the upper converging portion of the groove or channel on the spout, the wall being secured to the spout along its side edges.

Thus when the spout 1 and chamber wall J are complete the spout can be affixed to the body 2 of the pot with the end of the spout 1 surrounding the perforations B therein whilst the lower end of the bellied wall is positioned below the perforations.

By this construction any drip from the lip will run down outside the under portion E and be collected by the converging portion H and conducted to the groove or channel G from which it passes into the open mouth of the chamber to be retained therein during the use of the tea pot without fear of it leaving during any ordinary tilting of the pot.

The bellied wall J of the chamber follows the curve of the spout so that there is no increase of size or any difference in the ordinary shape.

We may position a wall in the chamber to further hold back any liquid if found desirable.

By this construction the inside of the spout and the chamber can be glazed thereby allowing of a proper cleaning of same being effected.

What we do claim as our invention and desire to secure by Letters Patent is:—

In tea, coffee and like pots, the combination with a body, of a pouring spout projecting from said body and provided at its under side with an angular lip, a bellied wall extending along a part of the length of the underside of the spout and having its upper end terminating below the said lip, the bellied wall forming a chamber having its upper end terminating at a distance below said lip to form an opening, and groove means extending along the exterior surface of the spout from the lip to the upper end of the bellied wall and converging from said lip towards the said opening to positively direct the drip from the lip into said chamber.

In testimony whereof we have hereunto set our hands.

CHARLES EDWARD GREEN.
KATHLEEN SINCLAIR STEVENSON.